Dec. 9, 1941.   J. H. SPAAN   2,265,322
CONTROL SYSTEM FOR AIR CONDITIONING SYSTEMS
Filed May 11, 1936
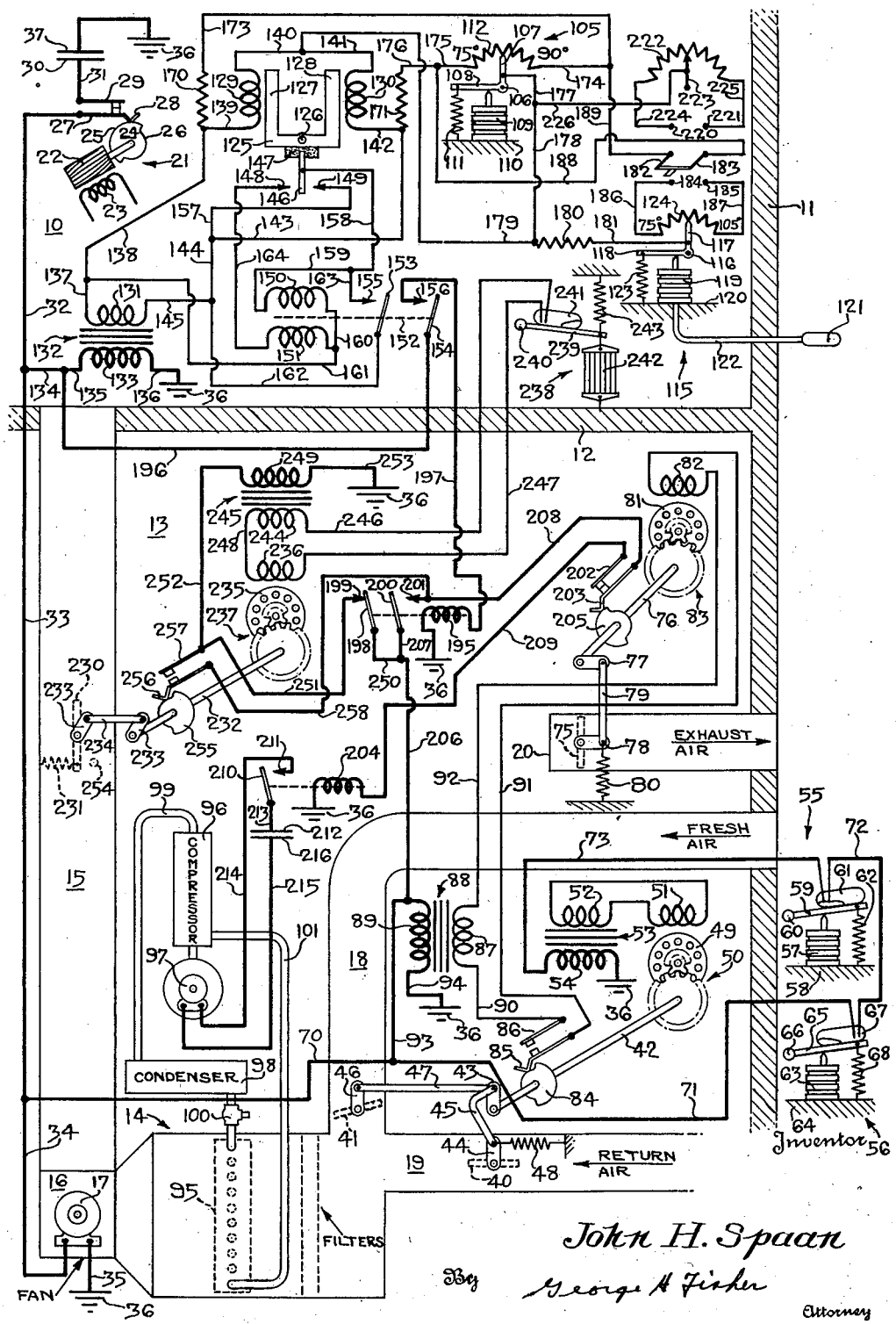
Inventor
John H. Spaan
By George H. Fisher
Attorney Patented Dec. 9, 1941

2,265,322

UNITED STATES PATENT OFFICE 2,265,322

CONTROL SYSTEM FOR AIR CONDITIONING SYSTEMS

John H. Spaan, Oklahoma City, Okla., assignor to Minneapolis-Honeywell Regulator Company, Minneapolis, Minn., a corporation of Delaware Application May 11, 1936, Serial No. 79,092

26 Claims. (Cl. 236—44)

The present invention relates to improvements in air conditioning systems, and particularly to those wherein both the temperature and relative humidity is controlled. In one specific embodiment of the invention, a cooling means is placed in operation whenever there is a demand for cooling by a space to be controlled and this cooling means is also placed in operation and the volume of air cooled thereby is reduced upon a demand for dehumidification, the arrangement being such that the reduction of the volume of air cooled can only take place both when there is a demand for dehumidification and when there is not a demand for cooling.

One of the objects of the present invention, therefore, is the provision of a combined cooling and dehumidifying system in which a cooling means is placed into operation upon a demand for cooling and in which the volume of air cooled is reduced upon a demand for dehumidification.

A further object of the invention is the provision of a combined cooling and dehumidifying system in which the cooling effect is controlled in accordance with demands for cooling and in which a volume damper is provided which is moved towards closed position upon a demand for dehumidification whereby to reduce the flow of air in contact with the cooling apparatus so that such air is cooled to a greater extent and more moisture is removed therefrom.

Other objects of the invention are the provision of systems of the type mentioned above wherein the reduction in the volume of cooled air can only take place in the event there is not a demand for cooling at such time and wherein the cooling means is operated or made effective upon such a reduction in the volume of air.

Another phase of the invention contemplates the maintaining of variable space temperatures as the outdoor temperature fluctuates so that higher space temperatures are maintained as the outdoor temperature rises. This is accomplished by means of a space temperature responsive controller having a wide range of response only a portion of which is utilized to control the effect of the cooling means and further providing an outdoor temperature responsive device which selects or determines that portion of the range of the space temperature responsive controller which shall be effective to control the effect of the cooling means. In such an arrangement, if it is desired to maintain a constant space temperature, some means must be provided for selecting the proper portion of the total range of operation of the space temperature responsive controller. The present invention, therefore, contemplates associating a manual compensating mechanism with the space temperature responsive controller, which manual mechanism is able to select the operating range of the space temperature responsive controller and further providing means so that either the outdoor temperature responsive controller or the manual mechanism can be associated with the space temperature responsive controller whereby the space temperature is either modified as a result of changes in outdoor temperature or the space temperature can be maintained constant at any value within the range of response of the space temperature responsive controller.

Other features of the invention include a novel means for controlling the delivery of fresh or return air to an air conditioning device and the exhausting of air from the space being conditioned and the manner in which cooling and dehumidification is permitted to take place only under those conditions wherein return air is being utilized for the air conditioning apparatus.

Further objects of the invention include combinations of the features and objects set forth above and will be found in the drawing, the detailed description and the appended claims.

For a more complete understanding of the invention, reference may be had to the following detailed description and the accompanying single drawing, which is a diagrammatic showing of one form of the present invention.

Referring to the single drawing, the space to be conditioned is indicated at 10 and is herein shown as being defined by an outside wall 11 and a floor 12. The air conditioning apparatus may be located in any desired place and is herein shown as located in the basement 13 which is defined by the same outside wall 11 and the floor 12 of the space 10, the floor 12 being the ceiling of the basement 13. Located in the basement 13 is an air conditioning device 14 which communicates with the space 10 through a delivery duct 15. Interposed between the duct 15 and the air conditioning device 14 is a fan 16 which is driven by an electrical motor 17. The air conditioning device 14 communicates with the outside atmosphere by means of a fresh air duct 18. It further communicates with the basement 13 by means of a return air duct 19. The space 10 in turn communicates with the basement 13 in any suitable manner such as through the usual stairway (not shown) so that air withdrawn from the space 10 flows through the basement 13 and then into the return air duct 19. The basement 13 further communicates with the outside atmosphere by means of an exhaust duct 20.

Whenever the fan motor 17 is energized, air is drawn into the air conditioning chamber 14 from the outside atmosphere or from the basement 13 depending upon the positions of damper means to be described in detail hereinafter, is conditioned in the air conditioning chamber 14 and is then delivered to the space 10 through the delivery duct 15. The present invention contemplates that the air conditioning apparatus will be operated only during the day and for the purpose of automatically shutting down the system at night and starting it in the morning a time switch generally indicated at 21 is provided. This time switch is shown herein as comprising a motor having a rotor 22 and a constantly energized field winding 23. The rotor 22 is connected to a cam 24 which is provided with a day portion 25 having a relatively large radius and a night portion 26 having a relatively small radius. Cooperating with this cam 24 is a switch arm 27 which is provided with a cam follower 28. Cooperating with the switch arm 27 is a second switch arm 29. With the parts in the position shown, the apparatus is on the day cycle so that it is in operation and under such conditions the fan motor 17 is continuously energized by a circuit as follows: line wire 30, wire 31, switch arm 29, switch arm 27, wire 32, wire 33, wire 34, fan motor 17 and wire 35 to ground 36, it being noted that the other line wire 37 is also connected to ground 36.

The return air duct 19 is provided with a damper 40 and the fresh air duct 18 is provided with a damper 41. These two dampers are positioned by a single motorized mechanism that includes a main operating shaft 42. This shaft operates a crank 43 which is connected to a similar crank 44 by means of a link 45, the crank 44 being connected to the return air damper 40. Similarly, a crank 46 is secured to the fresh air damper 41 and is connected to the crank 43 by means of a link 47. The return and fresh air dampers 40 and 41 are normally biased to the position in which they are shown by means of a biasing spring 48. It will be noted that the return air damper 40 is completely open under these conditions and that the fresh air damper 41 is substantially closed, it being partially open in order that a small amount of fresh air is taken in at all times.

The main operating shaft 42 is connected to a motor rotor 49 through suitable reduction gearing generally indicated at 50. Associated with the rotor 49 is a field winding 51 which is directly and continuously connected to the secondary 52 of a step-down transformer 53 having a high voltage primary 54. Whenever the primary 54 is energized, the field winding 51 will be energized whereupon the main operating shaft 42 is rotated in a counter-clockwise direction as viewed from the left so as to move fresh air damper 41 to its full open position and to move the return air damper 40 to its full closed position against the biasing action of spring 48.

Energization of this primary 54 is not only controlled by the time switch described above but is additionally controlled by a pair of thermostats which are generally indicated at 55 and 56. Both of these thermostats respond to outside temperature and they are herein shown as located outside of the wall 11. The thermostat 55 includes a bellows 57, one end of which is secured to a suitable support 58 and the other end of which bears against a switch carrying arm 59 that is pivoted at 60. This switch carrying arm 59 supports a mercury switch 61. The bellows 57 is charged with a suitable volatile fluid so that varying pressures are created therein upon outdoor temperature changes and these varying pressures are opposed by a coiled spring 62 which has one of its ends secured to the switch carrying arm 59 and its other end secured to the support 58.

The other thermostatic mechanism 56 is generally similar to the thermostatic mechanism 55. This thermostatic mechanism 56, therefore, includes a bellows 63 which has one of its ends fastened to a suitable support 64. The other end of bellows 63 engages a switch carrying arm 65 that is pivoted at 66. This switch carrying arm 65 supports a mercury switch 67. The bellows 63 is likewise charged with a suitable volatile fluid and the variable pressures created therein by such volatile fluid are opposed by a coiled spring 68 which has one of its ends secured to the switch carrying arm 65 and its other end secured to the support 64.

It will be seen that the mercury switch 61 is so arranged that it is moved to closed circuit position upon temperature increase. The setting of the thermostatic mechanism 55 is such that the mercury switch 61 is moved to closed circuit position whenever the outdoor temperature rises to 65° F. or thereabove. On the other hand, the mercury switch 67 of the thermostatic mechanism 66 is moved to open position upon temperature rise or is closed upon temperature fall. The setting of this thermostatic mechanism is such that the mercury switch 67 is open whenever the outside temperature is at or above 75° F. and is closed for all values therebelow.

With the parts in the position shown, the outside temperature is substantially 90° F., wherefore the mercury switch 61 is closed and the mercury switch 67 is open. Under these conditions the primary 54 is deenergized and the fresh air damper is substantially completely closed and the return air damper is full open. If the outdoor temperature should now fall below 75° F. but remains above 65° F., then both mercury switches 61 and 67 will be closed and, if these conditions occur during the daytime the primary 54 will be energized as follows: line wire 30, wire 31, switch arm 29, switch arm 27, wire 32, wire 33, wire 70, wire 71, mercury switch 67, wire 72, mercury switch 61, wire 73, primary 54 and ground 36. This results in energization of field winding 51 and movement of the fresh air damper 41 to full open position and movement of return air damper 40 to full closed position so that all fresh air is furnished to the air conditioning device 14 under these conditions. If the outside temperature continues to fall and falls below 65° F., then the circuit traced above will be interrupted at the mercury switch 61 and the fresh and return air dampers will be returned to the position shown in the drawing under the influence of biasing spring 48.

Whenever the return air damper is open there is of course, no air to be exhausted to the outside atmosphere so that the exhaust duct 20 should be closed off. For this purpose, the exhaust duct 20 is provided with an exhaust damper 75 which is operated by the main operating shaft 76 of a second motorized mechanism. This main operating shaft 76 and the damper 75 are interconnected by means of cranks 77 and 78 and a connecting link 79. A spring 80 biases the exhaust damper 75 to its closed position. The main operating shaft 76 is operated by a motor that includes a rotor 81 and a field winding 82. The rotor 81 is connected to the main operating shaft 76 by reduction gearing generally indicated at 83.

In order to conveniently control the position of exhaust damper 75 in accordance with the positions of the return air damper 40 and the fresh air damper 41, the main operating shaft 42 is provided with a cam 84 which operates a switch arm 85 that is associated with a second switch arm 86. The cam 84 is so arranged that whenever the main operating shaft 42 initially moves in return air damper closing direction, the switch arm 85 is moved into engagement with the switch arm 86. These switch arms are then held in engagement with one another until the return air damper is again opened. Closure of switch arms 85 and 86 completes a circuit to the field winding 82 as follows: Secondary 87 of a transformer 88 having a primary 89, wire 90, switch arm 86, switch arm 85, wire 91, field winding 82, and wire 92, to the other side of secondary 87. The primary 89 is continuously energized during the day by a circuit as follows: line wire 30, wire 31, switch arm 29, switch arm 27, wire 32, wire 33, wire 70, wire 93, primary 89, wire 94 and ground 36.

Therefore, whenever the return air damper is closed and the fresh air damper is completely open, the field winding 82 will be energized whereupon the main operating shaft 76 rotates in a counter-clockwise direction and opens the exhaust damper 75 against the biasing action of spring 80. Then whenever the return damper again opens and the fresh air damper moves to its substantially full closed position, the switch arms 85 and 86 will separate so as to deenergize field winding 82. The spring 80 then rotates exhaust damper 75 and the associated mechanism back to the position shown in the drawing wherein the exhaust damper 75 is closed.

The air conditioning device 14 may be provided with any of the usual types of cooling devices and is herein shown as provided with a cooling coil 95. This cooling coil 95 may be provided with any suitable cooling medium and in the present invention the cooling action is obtained by means of a mechanical refrigeration system. This system includes a compressor 96 which is driven by a compressor motor 97. The hot gaseous refrigerant is directed from the compressor 96 to a condenser 98 by means of a pipe 99. This refrigerant is liquefied in the usual manner by the condenser 98 and is then delivered to the cooling coil 95 under the control of a plain expansion valve 100. After the refrigerant has passed through the cooling coil 95 it is returned to the compressor 96 by means of a pipe 101.

The compressor motor 97 is controlled primarily as a result of changes in the temperature of the space 10, through suitable intermediate mechanism to be described hereinafter, by means of a space temperature responsive thermostat generally indicated at 105. This thermostat includes a bell crank pivoted at 106 which includes a control arm 107 and an actuating arm 108. These arms are positioned by one end of a bellows 109, the other end of which is connected to a suitable support 110. The bellows is charged with a suitable volatile fluid so that variable pressures are created therein upon space temperature change. These variable pressures are opposed by a coiled spring 111 which has one of its ends secured to the actuating arm 108 and its other end secured to the support 110. The control arm 107 cooperates with a control resistance 112. The arrangement is such that the control arm 107 completely traverses the control resistance 112 upon space temperature changes ranging from 75° F. to 90° F. With the parts in the position shown, the space temperature is substantially 82½° F.

The effect of the space thermostat 105 is adapted to be automatically varied by an outdoor temperature responsive thermostat indicated generally at 115. This thermostat includes a bell crank pivoted at 116 which is provided with a control arm 117 and an actuating arm 118. One end of a bellows 119 positions the actuating arm 118 and the other end of this bellows is fastened to a suitable support 120. The bellows is connected to a controlling bulb 121 by means of a communicating tube 122. The bellows, bulb and tube are charged with a suitable volatile fluid so that varying pressures are created within the bellows upon changes in the temperature to which the controlling bulb 121 is subjected. These variable pressures are opposed by a coiled spring 123 which has one of its ends secured to the actuating arm 118 and its other end secured to the support 120. The control arm 117 cooperates with a control resistance 124. As indicated above, this thermostat 115 responds to outdoor temperature and for this purpose the controlling bulb 121 has been shown as located outside of the space 10. The setting of this instrument is preferably such that the control arm 117 completely traverses the control resistance 124 upon changes in the outside temperature ranging from 75° F. to 105° F. As indicated above, the outdoor temperature is substantially 90° F. wherefore the control arm 117 is engaging the center of control resistance 124.

These two thermostats 105 and 115 cooperate in the control of a relay mechanism which includes an armature 125 that is pivoted at 126. This armature 125 is provided with legs 127 and 128. Cooperating with these legs 127 and 128 are relay windings 129 and 130. These relay windings 129 and 130 are connected in series across the secondary 131 of a transformer 132 having a high voltage primary 133. This primary 133 is connected to the line wire 30 through the time switch by a circuit as follows: line wire 30, wire 31, switch arm 29, switch arm 27, wire 32, wire 134, wire 135, primary 133, wire 136 and ground 36. Therefore, during the day the transformer 132 is constantly energized. The series circuit for the relay windings 129 and 130 is as follows: secondary 131, wire 137, wire 138, wire 139, relay winding 129, wire 140, wire 141, relay winding 130, wire 142, wire 143, wire 144 and wire 145 to the other side of secondary 131.

The armature 125 positions a switch arm 146, the switch arm 146 being connected to the armature 125 through a piece of insulating material 147. This switch arm 146 cooperates with a pair of spaced contacts 148 and 149. When the two relay windings 129 and 130 are equally energized the switch arm 146 is disposed intermediate the contacts 148 and 149. If the relay winding 130 is energized more highly than relay winding 129, then the switch arm 146 engages the contact 149. Conversely, if the relay winding 129 is energized more highly than the relay winding 130, then switch arm 146 engages the contact 148.

The switch arm 146 and the contacts 148 and 149 control a relay mechanism which includes a pair of windings 150 and 151 that cooperate to control the position of a single armature 152. The winding 150 is an energizing winding or operating winding and the winding 151 is a bucking winding or neutralizing winding. The armature 152 controls a pair of switch arms 153 and 154 which respectively cooperate with contacts 155 and 156.

Upon engagement of switch arm 146 with contact 149, the operating winding 150 is energized as follows: secondary 131, wire 145, wire 144, wire 157, contact 149, switch arm 146, wire 158, wire 159, operating winding 150, wire 160, wire 161, and wire 137 to the opposite side of secondary 131. Armature 152 is thereupon attracted and moves switch arms 153 and 154 into engagement with contacts 155 and 156. Engagement of switch arm 153 with contact 155 establishes a holding circuit for operating winding 150 which is entirely separate from the switch arm 146 and contact 149. This holding circuit is as follows: secondary 131, wire 145, wire 162, switch arm 153, contact 155, wire 163, wire 159, operating winding 150, wire 160 and wire 161 to wire 137 to the other side of secondary 131. The operating winding 150 will, therefore, remain energized even though switch arm 146 separates from contact 149. If switch arm 146 then engages contact 148 a circuit for neutralizing winding 151 is established as follows: secondary 131, wire 145, wire 162, switch arm 153, contact 155, wire 163, wire 158, switch arm 146, contact 148, wire 164, neutralizing winding 151, wire 161, and wire 137 to the opposite side of the secondary 131. The magnetic effect produced by neutralizing winding 151 off-sets that produced by operating winding 150, whereupon armature 152 and switch arms 153 and 154 move to the position shown in the drawing by gravity. Separation of switch arm 153 from contact 155 interrupts both the circuit for the neutralizing winding 151 and the holding circuit for the operating winding 150. The relay mechanism, therefore, must remain in the position shown until switch arm 146 again engages contact 149. The switch arm 154 and associated contact 156 control a circuit which will be described hereinafter, it being noted that these parts engage as the result of switch arm 146 engaging the contact 149 and then remain in engagement until such time as switch arm 146 engages contact 148.

In order that the thermostat 105 can be effective to vary the relative energizations of the relay windings 129 and 130, the control resistance 112 is connected in parallel with these series connected relay windings through a pair of protective resistances 170 and 171. This circuit is as follows: from the lower end of relay winding 129, wire 139, protective resistance 170, wire 173, wire 174, control resistance 112, wire 175, wire 176, protective resistance 171, and wire 142 to the lower end of relay winding 130. The control arm 107 of this thermostat 105 is connected intermediate the relay windings 129 and 130, by being connected to the junction of wires 140 and 141, by means of wires 177, 178 and 179.

The control arm 117 of the outdoor thermostat 115 is also connected intermediate the relay windings 129 and 130 by being connected to the junction of wires 178 and 179, through a resistance 180. It will be noted that one end of the resistance 180 is connected to the junction of wires 178 and 179, whereas its other end is connected to the control arm 117 by a wire 181. The outdoor controller 115 is normally electrically connected to the system but under certain conditions is manually disconnected therefrom for reasons which will be set forth further on in this description. For this purpose, a double-pole double-throw manual switch is provided which includes switch arms 182 and 183. These switch arms 182 and 183 normally engage contacts 184 and 185 and these contacts are connected to the ends of the control resistance 124 by means of wires 186 and 187. The switch arm 182 is connected to the junction of wires 173 and 174 by a wire 189 and the switch arm 183 is connected to the junction of wires 175 and 176 by a wire 188.

Assuming that the apparatus is now operating on a day cycle, so that the primary 133 of transformer 132 is energized, and further assuming that the outdoor controller 115 is connected to the system by reason of switch arms 182 and 183 being engaged with contacts 184 and 185, then with the space temperature at 82½° F. and the outdoor temperature at 90° F., the control arms 107 and 117 will be engaging the center of control resistances 112 and 124. Under these conditions the left-hand half of control resistance 112 and the protective resistance 171, in series, are connected in parallel with the relay winding 130. Similarly, the right-hand half of control resistance 112 and the protective resistance 170, in series, are connected in parallel with the relay winding 129. In addition, the right-hand half of control resistance 124 and the resistance 180 and the protective resistance 171, all in series, are connected in parallel with the relay winding 130 and its left-hand half in series with the resistance 180 and protective resistance 170, is connected in parallel with the relay winding 129. Under these conditions, it will be obvious that equal amounts of current will flow through the two relay windings 129 and 130 and that the switch arm 146 will be disposed intermediate contacts 148 and 149 as shown.

If the space temperature should rise somewhat, control arm 107 will move along control resistance 112 towards its right-hand end. This will remove part of the control resistance 107 from its parallel relationship with the relay windings 129 and will insert more of this control resistance in the parallel circuit that is associated with the relay winding 130. More current will, therefore, flow through the relay winding 130 and less will flow through the relay winding 129. When the space temperature then has risen sufficiently so as to increase the energization of relay winding 130 to a large enough extent in respect to the energization of relay winding 129, armature 125 will have been rotated in a counter-clockwise direction to such an extent as to move switch arm 146 into engagement with contact 149. Switch arm 154 will, therefore, be moved into engagement with contact 156 in the manner explained above in detail. Then if the space temperature subsequently falls sufficiently far, the opposite action will take place and the relay winding 129 will be energized more highly than the relay winding 130 so as to move switch arm 146 into engagement with contact 148. It is, therefore, seen that rise in the space temperature causes switch arm 154 to engage contact 156 and fall in space temperature causes these parts to separate.

Only a small portion of movement of the space temperature responsive thermostat 105 is required to bring about these changes in the energizations of relay windings 129 and 130. The purpose of the outdoor controller 115 is to select that portion of the total range of the space temperature responsive controller 105 which will be effective to bring about these changes in the energizations of the relay windings 129 and 130. It will be noted that if the outdoor temperature should rise, then the control arm 117 will move along the control resistance 124 towards its right-hand end. This will remove from the above-mentioned parallel circuit for relay winding 130 a part of the control resistance 124 and will insert more of this control resistance 124 in the above-mentioned parallel circuit for relay coil 129. This change in the amount of resistance in parallel with these relay windings reduces the current flow through relay winding 130 and increases the current flow through relay winding 129 which would tend to move switch arm 146 into engagement with contact 148. In other words, a rise in outdoor temperature has the effect of a fall in the space temperature. Stated in another way, as the outdoor temperature rises the space temperature must become higher in order to move switch arm 154 into engagement with contact 156. The outdoor controller 115 therefore serves to raise the control point of the space temperature responsive controller 105 as the outdoor temperature rises. However, since the outdoor controller 115 has a range of from 75° F. to 105° F., and whereas the space temperature responsive controller 105 only has a range of from 75° F. to 90° F., the control point of the controller 105 will only be raised one degree for each two degree rise in outdoor temperature, wherefore an increasing differential is maintained between the outside and space temperatures as the outside temperature rises from 75° F. to 105° F. The purpose of the resistance 180 is to limit the effect of the controller 115 upon the energizations of the relay windings 129 and 130 to a sufficient extent so that the space temperature responsive controller 105 always has dominating control of the energizations of the relay windings 129 and 130. For a more detailed explanation of "compensated" systems of this general type, reference may be had to John E. Haines Patent No. 2,173,331 issued Sept. 19, 1939.

Whenever switch arm 154 engages contact 156 a relay coil 195 is energized by a circuit as follows: line wire 30, wire 31, switch arm 29, switch arm 27, wire 32, wire 134, wire 196, switch arm 154, contact 156, wire 197, relay coil 195 and ground 36. Energization of relay coil 195 moves a switch arm 198 from engagement with a contact 199 and moves a switch arm 200 into engagement with a contact 201. The switch arm 200 and contact 201 cooperate with a pair of switch arms 202 and 203 for controlling a relay coil 204 that in turn controls energization of the compressor motor 97. The switch arm 203 is positioned by a cam 205 that is driven by the main operating shaft 76 of the motor mechanism which positions the exhaust damper 75. Whenever exhaust damper 75 is closed, as shown in the drawing, then the switch arms 202 and 203 are engaged. However, as soon as the exhaust damper 75 is moved to open position, then the switch arm 203 is permitted to separate from the switch arm 202. This means that the switch arms 202 and 203 are only in engagement with each other at such times that the outside air is so high in temperature or so low in temperature that it is not being introduced into the air conditioning device 14. The circuit for relay coil 204 is as follows: line wire 30, wire 31, switch arm 29, switch arm 27, wire 32, wire 33, wire 70, wire 93, wire 206, wire 207, switch arm 200, contact 201, wire 208, switch arm 203, switch arm 202, wire 209, and relay coil 204 to ground 36. Energization of this relay coil 204 moves switch arm 210 into engagement with a contact 211 whereupon compressor motor 97 is energized as follows: line wire 212, wire 213, switch arm 210, contact 211, wire 214, compressor motor 97, wire 215, to line wire 216.

It will, therefore, be seen that whenever the space temperature rises to a point as determined by the outside temperature, and provided the outdoor temperature is above 75° F. so that the exhaust damper is closed, then the compressor motor is energized so as to furnish refrigerant to the cooling coil 95 and permit a cooling action to take place. This cooling action cannot take place, however, if the outside temperature is below 75° F. even though the space temperature is higher than 75° F. This is true since at these lower outside temperatures the exhaust damper is open as is the fresh air damper so that switch arms 202 and 203 are separated. However, it will be obvious that if the outside temperature is not above 75° F., that the outside air need not be cooled in order to reduce the space temperature if the temperature of the space should happen to be above 75° F.

In some instances it may be desired to maintain the space temperature constant and not raise or lower it upon rise and fall in outdoor temperature. If this is desired, then the manual switch is operated so as to move switch arms 182 and 183 from engagement with contacts 184 and 185 and into engagement with contacts 220 and 221. This places a manual potentiometer in circuit with the inside controller 105. This manual potentiometer comprises a control resistance 222 and a control arm 223. The opposite ends of the control resistance 222 are connected to the contacts 220 and 221 by means of wires 224 and 225. The control arm 223 is connected to the junction of wires 177 and 178 by a wire 226. It should now be apparent from the foregoing description that by manually manipulating this manual potentiometer the control point of the inside controller 105 can be varied as desired. If the outdoor controller were merely disconnected from the circuit without in turn connecting into the circuit this manual potentiometer, then it will be obvious that the space temperature controller 105 would control at the middle of its range or at substantially 82½° F. In order to shift the control point of this controller to the desired point in its total range of operation it is necessary to connect into the circuit this manual potentiometer which operates exactly the same way as the outdoor controller 115 except that instead of having its position varied automatically by outdoor temperature changes it is manually varied and will, therefore, maintain a constant adjustment of the space temperature responsive controller 105 irrespective of the outdoor temperature fluctuations.

The present invention contemplates obtaining dehumidification by operating the compressor motor 97 and at the same time reducing the volume of air passing through the air conditioning device 14. Reduction in the volume of air passing through this device slows down its motion to such an extent that it is cooled to a greater degree when passing over the cooling coil 95 wherefore more moisture is abstracted from such air. For this purpose a volume damper 230 is located in the delivery duct 15 and is normally biased to full open position by a spring 231. This damper 230 is controlled by a motor mechanism which includes an operating shaft 232. The operating shaft is connected to the damper 230 through a pair of cranks 233 and a connecting link 234. The main operating shaft 232 is driven by a motor which includes a rotor 235 and a field winding 236. This rotor 235 is connected to the main operating shaft 232 through suitable reduction gearing generally indicated at 237.

Energization of the field winding 236 is controlled, among other things, by a space relative humidity responsive device generally indicated at 238. This device includes a switch carrying arm 239 which is pivoted at 240 and supports a mercury switch 241. One end of a humidity responsive element 242 is connected to the switch carrying arm 239 and its other end is maintained stationary. Herein such end of the element 242 is shown secured to the floor 12 of room or space 10. A coiled spring 243 serves to maintain the element 242 under proper tension at all times. The arrangement is such that normally the mercury switch 241 is open and it only closes when the relative humidity rises to some excessive value such as 45 per cent. When this occurs a circuit is completed to the winding 236 as follows: secondary 244 of a transformer 245, wire 246, mercury switch 241, wire 247, field winding 236, and wire 248 to the other side of secondary 244. This transformer 245 is provided with a primary winding 249 which can only be energized in the event the apparatus is operating on a day cycle and in the event switch arm 198 is engaging contact 199. The circuit for this primary winding 249 is as follows: line wire 30, wire 31, switch arm 29, switch arm 27, wire 32, wire 33, wire 70, wire 93, wire 206, wire 250, switch arm 198, contact 199, wire 251, wire 252, primary 249 and wire 253 to ground 36. Therefore, if cooling is not taking place so that switch arm 198 is engaging contact 199, and if the relative humidity becomes excessive, then the field winding 236 is energized. Main operating shaft 232 is therefore operated in a counterclockwise direction as viewed from the left and swings the volume damper 230 partly closed. Movement of this damper 230 in closing direction is limited by a stop indicated at 254.

The main operating shaft 232 also operates a cam 255 which is adapted to move a switch arm 256 into engagement with a similar switch arm 257. These switch arms are moved into engagement whenever the main operating shaft 232 moves in volume damper closing direction. Engagement of the switch arm 256 with the switch arm 257 energizes the relay coil 204 provided the switch arms 202 and 203 are closed. This circuit is as follows: line wire 30, wire 31, switch arm 29, switch arm 27, wire 32, wire 33, wire 70, wire 93, wire 206, wire 250, switch arm 198, contact 199, wire 251, switch arm 257, switch arm 256, wire 258, wire 208, switch arm 203, switch arm 202, wire 209 and relay coil 204 to ground 36. Therefore, whenever the relative humidity becomes excessive the volume damper 230 is partially closed and the compressor is placed in operation if the fresh air damper is substantially closed. This partial closure of the volume damper 230 reduces the volume of air passing through the air conditioning device 14. Such a reduction in the volume of air causes it to move more slowly so that it is in contact with the cooling coil 95 for a longer period of time. As a result, the temperature of this air is lowered to a greater extent than it would otherwise be wherefore more moisture is removed therefrom. In this manner, a dehumidifying action takes place without the utilization of a separate dehumidifying coil, the results being obtained entirely by changing the rate of flow of the air in contact with a single cooling coil which is normally used for cooling.

With the apparatus wired as above described, it will be apparent that if a demand for cooling is prior to a demand for dehumidification, the damper 230 will be in open position, thus resulting in switch arm 256 being disengaged from switch arm 257, when relay coil 195 is energized due to the demand for cooling. If now, should a demand for dehumidification occur while the system is operating to satisfy the demand for cooling, the damper 230 will remain open, due to the open switches 256—257 and 198—199 preventing energization of the primary 249 of damper motor transformer 245. This result is advantageous, for with a direct expansion cooling coil, the latent heat removing or dehumidifying action remains substantially constant for any normal rate of air flow across the coil. In other words, just as many grains of moisture will be removed by the coil whether the rate of air flow thereacross is fast or slow. If the air is passed over the coil at relatively high velocity, the moisture removal must be spread over a relatively large volume of air, and consequently, the moisture removal per unit of volume of air passed across the coil will be relatively low. Conversely, if the air is passed over the coil at relatively low velocity due to partial closure of damper 230, the moisture removal will be spread over a smaller volume of air, and consequently, the moisture removal per unit of volume of air would be greater, thus causing the air to emerge from the cooling coil at lower absolute humidity than would occur if the rate of air flow across the coil were higher. While the moisture removal capacity of the coil is not affected by the rate of air flow thereacross, the cooling or sensible heat removal capacity of the coil varies with the rate of air flow across the coil. If the damper 230 is wide open, the sensible heat removal action will be far greater than occurs when said damper is partially closed. From the foregoing explanation, it should be apparent that the cooling coil always has both a cooling and a dehumidifying action, the cooling action varying with the position of damper 230, and the dehumidifying action remaining substantially constant. Therefore, if the system is placed in operation initially by a demand for cooling, it will act to both cool and dehumidify, and if for some reason, the humidity controller should call for dehumidification during such period of operation, the demand for dehumidification would inherently be slight. Under such circumstances, the dehumidifying action of the coil which accompanies the cooling action would more than likely satisfy this slight demand for dehumidification by the time that the demand for cooling is satisfied. It is therefore of advantage to prevent partial closing of damper 230 when the demand for cooling is prior to the demand for dehumidification, as such action permits the cooling effect of the coil to be unrestricted, which is desirable at such time.

If, however, the demand for dehumidification occurs before a demand for cooling, the damper 230 will be in partially closed position, and switch 256—257 will be closed at the time that relay coil 195 is energized by the demand for heat. With this condition, while the damper motor energizing circuit passing through switch arm 198 and contact 199 will be broken, a new energizing circuit for the damper motor will be established as follows: wire 206, wire 207, switch arm 200, contact 201, wire 258, switch arm 256, switch arm 257, wire 252, transformer primary 249, and wire 253 to ground. Therefore, if the demand for dehumidification occurs prior to a demand for cooling, the system will continue to operate on the dehumidifying cycle until the demand for dehumidification is satisfied, at which time, the system will begin to operate on the cooling cycle, and remain in such operation until the demand for cooling is satisfied. This result is also advantageous, for if the demand for dehumidification occurs first, the system will act to both cool and dehumidify, and if a demand for cooling occurs at such time, it will inherently be light, and will to some extent be taken care of by the cooling action which accompanies the dehumidifying action. By preventing the system from going into the cooling cycle, if the demand for dehumidification is first, the system is prevented from overcooling the space by possible operation on the dehumidifying cycle after the demand for cooling is satisfied. In other words, by the arrangement shown and described, the system will act first to dehumidify (accompanied by some cooling) until the demand for dehumidification is satisfied, before operating on the cooling cycle to satisfy the demand for cooling. As the demand for dehumidification must therefore be satisfied before the demand for cooling, the system will be placed out of operation when the demand for cooling is satisfied, and no overcooling of the space will result. A further advantage of preventing the system from going on the cooling cycle when dehumidification is taking place is that due to the reduced rate of temperature reduction, the relative humidity is brought back to the proper value, much sooner than would occur if the rate of temperature reduction were faster as would occur if the system were operating on the cooling cycle, for relative humidity tends to increase with reduction of temperature.

At night, the time switch 21 will cause switch arms 27 and 29 to separate thereby interrupting all of the high voltage circuits set forth above with the exception of the compressor motor circuit but this is in turn controlled by a relay that has its circuit broken by operation of the time switch. As a result, the air conditioning apparatus can not be operated at night. Also, since the various motor mechanisms are all of the power failure type or spring return type, at night the various dampers will return to the position shown wherein the fresh air damper is substantially completely closed, the exhaust damper is closed and the return air damper is full open.

Briefly summing up the operation of the system of this invention, the system is rendered inoperative at night, and operates only during the day. Whenever the outside temperature is at an intermediate value such as between 65° F. and 75° F., all fresh air is utilized and it is impossible to obtain either a cooling action or a dehumidifying action since with outside air temperature at such values it should be unnecessary to furnish cooling or dehumidification. However, if the temperature rises above 75° F. or falls below 65° F. then return air is utilized to the exclusion of fresh air except that a minimum amount of fresh air is always taken into this system when the fan is operating. Now, if the space temperature becomes too high while return air is being utilized, then the compressor is placed in operation so as to lower the temperature of the space. The space temperature thus maintained, however, is not maintained at a constant value but is raised as the outdoor temperature rises. If it is desired to maintain a constant space temperature, this can be accomplished by disconnecting the outdoor controller through the manual switch and connecting the manual potentiometer to the circuit and manipulation of the manual potentiometer will then permit the space temperature controller to be set to operate at any desired value within its range of from 75° F. to 90° F.

Also, when return air is being utilized in the system, if the relative humidity becomes excessive while a cooling action is not taking place, then the compressor is placed in operation and the volume of air in circulation is reduced so that the same cooling coil is enabled to cool the air to a greater extent so as to remove more moisture therefrom and in this manner reduce the relative humidity.

It will be obvious that many changes can be made in the system illustrated herein without departing from the spirit of this invention and I am therefore to be limited only by the scope of the claims appended hereto.

I claim:

1. A cooling and dehumidifying system of the class described, comprising, in combination, a cooling coil, means to pass air thereover to obtain a cooling action, means to deliver the cooled air to a space to be cooled, a volume damper which is normally open to permit a predetermined flow of air over said cooling coil, and means responsive to relative humidity to move said volume damper to a partially closed position when the relative humidity becomes excessive to reduce the flow of air over said cooling coil.

2. A cooling and dehumidifying system, comprising, a cooling coil, means to pass air in contact therewith and to deliver such air to a space to be cooled, temperature responsive means in control of the delivery of cooling fluid to said coil, damper means to reduce the rate of flow of air in contact with said cooling coil, and humidity responsive means in control of said damper means and operative to cause said damper means to reduce the rate of flow of air upon a rise in the value of the relative humidity.

3. In combination, a cooling coil, means to pass air in contact therewith and then to a space to be cooled, means in control of the supplying of cooling medium to said cooling coil, temperature responsive means in control of said last-named means to permit the supplying of cooling medium to said coil upon a demand for cooling, means to reduce the rate of flow of the air in contact with said cooling coil, and means responsive to air moisture content operative upon a rise in the value of the relative humidity to cause operation of said last-named means and to control said cooling medium supply controlling means so as to insure a supply of cooling medium to said coil.

4. In combination, a cooling coil, means to pass air in contact therewith and then to a space to be cooled, refrigeration means to cool said cooling coil, means responsive to space temperature to place said refrigeration means into operation upon a demand for cooling, means to reduce the rate of flow of air in contact with said cooling coil, and means responsive to the relative humidity of the space to operate said last-named means to reduce the flow of air in contact with the coil and to place said refrigeration means into operation if such relative humidity becomes too high.

5. In a combined cooling and dehumidifying system, in combination, means to cool air and pass it to a space to be cooled, temperature responsive means in control of the effect of said cooling means on the air, means to reduce the rate of flow of air, means responsive to relative humidity in control of said air flow reducing means, and means to prevent control of said air flow reducing means by said relative humidity responsive means when said cooling means is being operated by said temperature responsive means.

6. In combination, means to cool air before it is passed to a space to be cooled, an electrically energizable device in control of said air cooling means, a relay in control of said device, a temperature operated switch in control of said relay, a switch which is opened by said relay when cooling is taking place, means to reduce the flow of air being cooled, an air moisture content controlled switch, and a circuit for said air flow reducing means controlled by said relay operated switch and moisture controlled switch.

7. The combination with a cooling system for cooling a predetermined volume of air, of damper means to reduce the volume of air cooled by such system, an electrical device in control of said volume reducing means, an air moisture responsive device in control of said electrical device and operative upon an increase in air moisture to cause said device to effect a reduction in the volume of air, and switching means operated by said electrical device to place the cooling system in operation upon a reduction of the volume of air cooled thereby.

8. A compensating control system of the class described, comprising, in combination, means to be controlled, a main controller in control thereof having a wide range of response only part of which is utilized in controlling said means, said main controller being operative through an electrical network, a compensating controller connected through said electrical network with said main controller to determine which portion of the total range of the main controller shall be effective to control said means, a manual compensating device, and means to disconnect said compensating controller from said main controller and to connect said manual compensator thereto through said electrical network whereby said main controller may be made to control said means at any point in its total range.

9. A compensated temperature controlling system, comprising, in combination, temperature changing means, a temperature responsive controller in control of said means and having a wide range of response only a portion of which is utilized to control said means, said controller being operative through an electrical network, a second temperature responsive controller connected with said first controller by said electrical network and operative to select the effective portion of the total range of response of the first controller, a manual controller also operative through said electrical network to select the operative portion of the total range of said first controller, and means to disconnect said second controller from said first controller and to connect said manual controller thereto.

10. In combination, a device to be controlled, a first variable impedance condition responsive controller in control of said device and having a wide range of response only a portion of which is utilized to control said device, a second variable impedance condition responsive controller operative to select the operative portion of the total range of said first controller, a manually adjustable impedance also operative to select the operative portion of the total range of said first controller, and means to selectively connect said second controller or said manually adjustable impedance in parallel with said first controller.

11. In a compensated temperature control system, in combination, means to cool a space to be controlled, a space temperature responsive controller having a wide range in control of said means, only a portion of said range being utilized to control said means, an outdoor temperature responsive controller operative to select the effective point of control of said space temperature responsive controller whereby varying space temperatures are maintained upon outdoor temperature variations, a manual controller operative to select the effective point of control of said space temperature responsive controller whereby any constant space temperature within the range of the space temperature responsive controller may be maintained, and means to selectively associate either said outdoor temperature responsive controller or said manual controller with said space temperature responsive controller.

12. In a compensated temperature control system, in combination, means to cool a space to be controlled, a space temperature responsive controller having a wide range in control of said means, only a portion of said range being utilized to control said means, an outdoor temperature responsive controller operative to select the effective point of control of said space temperature responsive controller whereby varying space temperatures are maintained upon outdoor temperature variations, a manual controller operative to select the effective point of control of said space temperature responsive controller whereby any constant space temperature within the range of the space temperature responsive controller may be maintained, means to selectively associate either said outdoor temperature responsive controller or said manual controller with said space temperature responsive controller, and means responsive to space relative humidity to additionally control said cooling means.

13. An air conditioning system of the class described, comprising, in combination, an air conditioning device, damper means in control of the flow of both fresh and return air thereto, motor means in control of said damper means to selectively permit or substantially prevent the flow of fresh air to said device and to substantially prevent or permit the flow of return air to said device, means responsive to a rise in outdoor temperature above a selected value to operate said motor means to prevent the flow of fresh air to said device, means to cool the air delivered to said device, and means operated by said motor means to permit cooling of such air by the cooling means only when return air is being delivered to said device.

14. An air conditioning system of the class described, comprising, in combination, an air conditioning device, damper means in control of the flow of fresh and return air thereto, motor means in control of said damper means to selectively permit or prevent the flow of fresh air to said device, means responsive to a rise in outdoor temperature above a selected value to operate said motor means to prevent the flow of fresh air to said device, means to cool the air delivered to said device, means operated by said motor means to prevent cooling of such air by the cooling means when fresh air is being delivered to said device, means to reduce the flow of air through said device, and air moisture responsive means in control of said last-named means rendered operative by said motor operated means when fresh air is not being delivered to said device.

15. In an air conditioning system, in combination, an air conditioning device, first damper means in control of the flow of fresh and return air to said device, first motor means in control of said damper means, second damper means in control of exhausting air to the outside atmosphere, second motor means in control of said second damper means, means operated by one of said motor means to control the other of said motor means to permit the exhausting of air when fresh air is being supplied in an appreciable quantity to said air conditioning device, means responsive to outdoor conditions in control of said one motor means, means to cool the air delivered to the air conditioning device, and means operated by one of the motor means to prevent cooling of the air if fresh air is being delivered to said device in any appreciable quantity.

16. In an air conditioning system, in combination, an air conditioning device, first damper means in control of the flow of fresh and return air to said device, first motor means in control of said damper means, means responsive to outdoor conditions in control of said motor means, second damper means in control of exhausting air to the outside atmosphere, second motor means in control of said second damper means, means operated by said first motor means to control said second motor means to permit the exhausting of air when fresh air is being supplied in an appreciable quantity to said air conditioning device, means to cool the air delivered to the air conditioning device, means to reduce the volume of air flowing through said air conditioning device, moisture responsive means in control of said last-named means, and means operated by said second motor means to prevent operation of said cooling means or said volume reducing means when fresh air in any appreciable quantity is being furnished to said air conditioning device.

17. A cooling and dehumidifying system, comprising a cooling device, means to pass air through said cooling device for a conditioning action, damper means for controlling the flow of air through said cooling device, and humidity responsive means for controlling said damper means in a manner to reduce the air flow through said cooling device upon an increase in humidity.

18. A cooling and dehumidifying system, comprising a cooling device, means to pass air through said cooling device, means for supplying cooling fluid to said cooling device, temperature responsive means for controlling the supply of cooling medium to said cooling device, damper means for controlling the flow of air through said cooling device, and humidity responsive means for controlling said damper means in a manner to reduce the air flow through said cooling device upon an increase in humidity.

19. In a combined cooling and dehumidifying system, in combination, means to cool air and pass it to a space, means for supplying cooling fluid to said cooling means, means for reducing the flow of air through said cooling means, temperature responsive means for controlling said cooling fluid supply means to cause a supply of cooling fluid upon a demand for cooling, humidity responsive means for controlling said supplying means and said flow reducing means to cause a supply of cooling fluid and to reduce the air flow upon a demand for dehumidification, and means for preventing operation of said flow reducing means by said humidity responsive means when the supplying means is already in operation for cooling said space.

20. In a combined cooling and dehumidifying system, in combination, means to cool air and pass it to a space, means for supplying cooling fluid to said cooling means, means for reducing the flow of air through said cooling means, temperature responsive means for controlling said cooling fluid supply means to cause a supply of cooling fluid upon a demand for cooling, humidity responsive means for controlling said supplying means and said flow reducing means to cause a supply of cooling fluid and to reduce the air flow upon a demand for dehumidification, means controlled by said temperature responsive means for preventing operation of said flow reducing means by said humidity responsive means when the supplying means is being operated to satisfy a demand for cooling, and means for maintaining said flow reducing means in operation when placed in operation by said humidity responsive means until the demand for dehumidification is satisfied.

21. In an air conditioning system, in combination, air conditioning means for cooling and dehumidifying air being passed to a space, means for causing said air conditioning means to predominately dehumidify the air at times and to predominately cool the air at other times, and control means therefor including means to prevent said means for predominately dehumidifying from being placed in operation when said means for predominately cooling is already in operation.

22. In an air conditioning system, in combination, air conditioning means for cooling and dehumidifying air being passed to a space, means for causing said air conditioning means to predominately dehumidifying the air at times and to predominately cool the air at other times, and control means therefor including means to prevent said means for predominately cooling from being placed in operation when said means for predominately dehumidifying is already in operation.

23. In an air conditioning system, in combination, means for cooling air, means for dehumidifying air, temperature responsive means for controlling said cooling means, humidity responsive means for controlling said dehumidifying means, means for preventing said humidity responsive means from operating said dehumidifying means when the cooling means is being operated, and means for preventing said temperature responsive means from operating said cooling means when the dehumidifying means is being operated.

24. In an air conditioning system, in combination, means for cooling air, means for dehumidifying air, and control means for said cooling means and said dehumidifying means, said control means including means to prevent operation of the dehumidifying means while the cooling means is being operated, and to prevent operation of the cooling means while dehumidifying means is bing operated.

25. In apparatus for supplying cooled and dehumidified air to an encloseure, the combination of a cooling element, means for conveying air in contact with the cooling element and to the enclosure, means for varying the flow of air so as to supply air from the cooling element to the enclosure at a relatively high rate or at a relatively low rate, means for supplying cooling fluid to the cooling element, temperature responsive means for controlling the cooling fluid supply means to supply cooling fluid to the cooling element and the flow varying means to provide a relatively high rate of air supply upon demand for cooling, humidity responsive means for controlling the cooling fluid supply means to supply cooling fluid to the cooling element and the flow varying means to provide a relatively low rate of air supply upon demand for dehumidification, and means for preventing the flow varying means from reducing the rate of supply of air to the enclosure under control of the humidity responsive means when the temperature-responsive means is already controlling the cooling fluid supply means to supply cooling fluid to the cooling element and the flow varying means to provide a relatively high rate of air supply.

26. In apparatus for supplying cooled and dehumidified air to an enclosure, the combination of a cooling element, means for conveying air in contact with the cooling element and to the enclosure, means responsive to a predetermined maximum temperature of air for initiating supply of cooling fluid to the cooling element and responsive to a predetermined minimum temperature of air for terminating supply of cooling fluid to the cooling element, humidity responsive means for decreasing the velocity of the air flowing in contact with the cooling element upon increase in humidity and for increasing said velocity upon decrease in humidity, and means providing maximum velocity of air flowing over the cooling element at all times that supply of cooling fluid to the cooling element is terminated and the air conveying means is in operation.

JOHN H. SPAAN.